US008292086B2

(12) United States Patent (10) Patent No.: US 8,292,086 B2
Mickelat et al. (45) Date of Patent: Oct. 23, 2012

(54) STRAINER APPARATUS

(75) Inventors: Thomas Mickelat, Nittenau (DE);
Christoph Tichy, Regensburg (DE)

(73) Assignee: Andritz Fiedler GmbH, Regensburg (DE)

( * ) Notice: Subject to any disclaimer, the term of this patent is extended or adjusted under 35 U.S.C. 154(b) by 6 days.

(21) Appl. No.: 12/527,620

(22) PCT Filed: Apr. 1, 2008

(86) PCT No.: PCT/EP2008/002580
§ 371 (c)(1),
(2), (4) Date: Aug. 18, 2009

(87) PCT Pub. No.: WO2008/119548
PCT Pub. Date: Oct. 9, 2008

(65) Prior Publication Data
US 2010/0072113 A1 Mar. 25, 2010

(30) Foreign Application Priority Data
Apr. 2, 2007 (DE) .......................... 10 2007 015 901

(51) Int. Cl.
*B07B 1/20* (2006.01)
(52) U.S. Cl. ........ 209/395; 209/273; 209/305; 209/393; 210/415
(58) Field of Classification Search .................... 209/17, 209/273, 305, 306, 397, 393, 395; 210/413–415, 210/498, 512.1
See application file for complete search history.

(56) References Cited

U.S. PATENT DOCUMENTS
3,901,801 A 8/1975 Bixby
(Continued)

FOREIGN PATENT DOCUMENTS
EP 0 316 570 A2 5/1989
(Continued)

OTHER PUBLICATIONS

Andritz Pulp & Paper—Author: Gerd Habenicht, Title: KLEBEN (*Adhesive Bonding*) Grundlagen, Technologien, Anwendungen (*Fundamentals, Technologies, Applications*), 5. expanded and updated edition, ISBN 10 3-540-26273-3 Springer Verlag Berlin, Publication date around 2006 as per Google Books http ://www.amazon.de/Kleben-Grundlagen-Technologien-Anwendungen-VDI-Buch/dp/3540262733), p. 494, Fig. 8.36.

*Primary Examiner* — Joseph C Rodriguez
(74) *Attorney, Agent, or Firm* — Henry M. Feiereisen LLC

(57) ABSTRACT

The invention relates to a strainer apparatus, such as a strainer basket, a strainer cylinder and the like, wherein slits or gaps are formed between strainer bars (6). The base of the strainer bars is received in receiving recesses (8) adapted to the dimensions of the base of the bars, in a support element (3). The support element can also be a reinforcing or strengthening element, and the strainer bars (6) are permanently fixed to the respective support element (3). At least one pocket (10, 11) that can be filled with a filler material is provided between each support element (3) and each associated strainer bar (6), at least on the edge region (7) of the respective receiving recess (8). In the strainer apparatus according to the invention, the pocket interrupts the contact surface between the outer contour of the strainer bar (6) and the inner contour of the associated receiving recess in the support element (3), such that a pre-determined intermediate space is intentionally formed in the form of a pocket (10; 11), at least on the edge region (7). The pocket is then filled with a homogeneous or composite filler material used as a fixing means, wherein the filler material may be composed of, for example, an adhesive. In this way, a permanent solid connection can be produced between strainer bar (6) and support element (3).

14 Claims, 3 Drawing Sheets

U.S. PATENT DOCUMENTS

| | | | |
|---|---|---|---|
| 4,843,700 A * | 7/1989 | Arai | 29/896.62 |
| 5,011,065 A * | 4/1991 | Musselmann | 228/170 |
| 5,094,360 A * | 3/1992 | Lange | 220/485 |
| 5,165,548 A * | 11/1992 | Dumler et al. | 209/2 |
| 5,799,798 A * | 9/1998 | Chen | 209/306 |
| 5,921,591 A * | 7/1999 | Argent | 285/330 |
| 6,047,834 A * | 4/2000 | Dolle et al. | 209/395 |
| 6,579,458 B2 | 6/2003 | Mickelat et al. | |
| 6,789,681 B2 * | 9/2004 | Czerwoniak et al. | 209/405 |
| 7,125,491 B2 | 10/2006 | Gabl | |
| 2003/0226801 A1 | 12/2003 | Mickelat et al. | |
| 2005/0224199 A1 | 10/2005 | Mickelat | |

FOREIGN PATENT DOCUMENTS

| | | |
|---|---|---|
| EP | 0 417 408 A | 3/1991 |
| EP | 0 499 154 A | 8/1992 |
| EP | 0 808 941 A | 11/1997 |
| EP | 1 205 227 A1 | 5/2002 |
| EP | 1 630 282 A | 3/2006 |

* cited by examiner

STRAINER APPARATUS

CROSS-REFERENCES TO RELATED APPLICATIONS

This application is the U.S. National Stage of International Application No. PCT/EP2008/002580, filed Apr. 1, 2008, which designated the United States and has been published as International Publication No. WO 2008/119548 and which claims the priority of German Patent Application, Serial No. 10 2007 015 901.5, filed Apr. 2, 2007, pursuant to 35 U.S.C. 119(a)-(d).

BACKGROUND OF THE INVENTION

The invention is directed to a strainer apparatus, wherein straining slots or straining gaps are formed between preferably profiled strainer bars, which have base regions that are received in receiving cutouts of support elements and are permanently attached to the support elements. Such strainer apparatuses are also referred to as "Bar strainer apparatuses". These strainer apparatuses can be formed as planar screening plates or as round strainer baskets.

Strainer apparatuses employing this so-called "bar screening construction" are known in the art. For example, EP 0 316 570 describes a strainer basket and a method for producing the same, which has a straining slots extending parallel to its rotational symmetry axis and which includes individual profile bars or profile strainer bars which are inserted into cutouts that were previously machined by milling and are located on support elements implemented as support rings, where they are affixed by welding or brazing. To provide a permanent connection between strainer bar and receiving cutout on the support element, friction welding or compression welding are mentioned as possibilities. Also contemplated as welding processes are electric, laser beam and electron beam welding or autogenous welding. Another soldering method, in particular brazing, was described as a suitable process, with another suitable high-quality soldering process being vacuum soldering which produces a high-quality permanent connection between strainer bars and support elements, but disadvantageously involves a complex manufacturing process. The strainer basket is produced by inserting profile bars as strainer bars in a scaffold made of support elements, in the described case support rings, which are initially attached by spot welding and subsequently permanently welded. The strainer bars are here permanently welded along a contour, i.e., essentially along the edges of the receiving cutouts. It is also mentioned that these strainer bars can be connected with the support elements by using an adhesive.

EP 0 499 154 B1 discloses a strainer basket, which eliminates welding while still enabling a defined attachment of the strainer bars in the support elements. The individual strainer bars and the support elements are connected with a snap connection, so that the strainer bars can be pressed into the support elements perpendicular to the longitudinal dimensions of the support elements. In this embodiment, a suitable match between the profile of the strainer bars and the receiving cutouts in the support element is required in order to securely clamp the profile cross-sections of the strainer bars in the receiving cutouts of the support elements. The support elements are hereby held by a device in parallel arrangement to one another and with a spacing that corresponds to the spacing of the support elements; the strainer bars are then sequentially pressed into the receiving cutouts disposed on all support elements at once. Also envisioned in the manufacture can be a deflection in the opposite direction to slightly enlarge the receiving cutouts, thereby facilitating insertion of the strainer bars. If gaps are formed between the strainer bar and the support element after deflection, then these gaps are sealed with liquid plastic material (Loctite™) to prevent braid formation.

EP 0 808 941 B1 describes a process for producing a strainer apparatus with slotted openings and a strainer apparatus produced with this process. Accordingly, an economically advantageous process for producing such strainer apparatuses having optimal stability and surface properties is to be provided. The profile strainer bars are hereby moved into their corresponding position in the receiving cutout of the support element simply by insertion and are secured in place, where they remain until a bonding agent provides the final rigid attachment. The bonding agent establishes a non-releasable connection at the contact surfaces, similar to that attained by brazing, welding or with an adhesive. With contact welding only, the bonding agent is the melt formed from the components themselves. Advantageously, with this production method, brazing at a temperature of up to 900° C. can be employed. Optionally, higher temperatures can be selected. An adhesive can alternatively also be used as a bonding agent for making the connection, which allows manufacture at relatively low temperatures. For example, a technical two-component adhesive can be used which maintains the clamping forces between strainer bars in the base region and in the receiving cutouts of the support elements.

EP 1 205 227 A1 describes a process for producing strainer baskets as well as strainer baskets produced with this process. The strainer bars are secured in corresponding receiving cutouts of support elements by first sandblasting the corresponding strainer bars at the contact zones with the support elements to roughen the surface, and subsequently joining the strainer bars with the support elements in these sandblasted regions with an adhesive.

All these conventional strainer apparatuses, where the strainer bars are permanently attached in the support elements by way of a material connection, optionally combined with a force-transmitting and form-fitting connection, require either additional treatment of the contact surfaces, or the base profile of the strainer bars and the associated geometry of the receiving cutouts in the support elements must be matched within close tolerances. With welding processes or brazing processes, there may be an additional difficulty with inaccuracies in the relative attachment of strainer bars and receiving cutouts in the support elements caused by the high temperatures used in these processes and the resulting different thermal expansion properties, which can cause an undesirable wide scatter of the straining slot or gaps and a corresponding inaccuracy in the straining slot geometry.

SUMMARY OF THE INVENTION

It is therefore an object of the invention to provide a strainer apparatus, i.e., a so-called "bar strainer apparatus", which obviates the aforementioned problems and efficiently attains with a simple structure and manufacturing process a reliable, permanent and stable connection between the support elements and the associated strainer bars.

According to the invention, a strainer apparatus is provided which has straining slots or gaps formed between, preferably profiled, strainer bars, wherein the respective base regions of the strainer bars are received in receiving cutouts of support elements having a geometry that matches the geometry of the base regions, wherein the strainer bars are permanently attached to the support elements. The strainer apparatus is characterized in that at least one pocket is provided between each support element and each associated strainer bar at least in the edge region of the respective receiving cutout, wherein the at least one pocket can be filled with a filler material.

With the invention, a pocket or a pocket-shaped space is thus formed in a defined manner at least in the edge region between the outer surface of the profile bar and the receiving cutout, which is then filled with a suitable filler material after insertion of the corresponding strainer bar in the associated receiving cutout of the support element, thereby establishing a permanent and stable connection between the strainer bar and the associated receiving cutout of the support element. In addition, the straining slot or straining gap formed in the head region between adjacent strainer bars can be repeatedly and uniformly produced with high accuracy along the entire periphery of the strainer apparatus substantially in a predetermined manner, so that an operatively high-quality product in form of a strainer apparatus is obtained. With this intentional formation of the pockets provided by the invention, the number of the pockets in the edge region as well as their size and position can be freely selected, so that a permanent and stable connection of the respective strainer bar is attained after the corresponding pockets are filled with filler material, as well as a reliable and precise orientation of the corresponding receiving cutout of the support element.

According to preferred embodiments, the at least one pocket can be formed by suitable shaping of the strainer bar base region and suitable shaping of the receiving cutout in the corresponding support element. In this way, the manufacturing depth in the strainer apparatus of the invention can be matched to the intended requirements taking into consideration the accuracy and stability required for the corresponding application. Overlap regions between strainer bar and the corresponding support element, which may depend on the shape of the strainer bar, have proven to be advantageous for increasing the service life of the stable connection between strainer bar and cutout, with the height of the strainer bar being in a range of 3 mm to 25 mm, in particular of 5 mm to 18 mm, so that the overlap region is in the range of 4 mm to 50 mm, preferably in a range of 6 mm to 25 mm. With such a design, the respective receiving cutout in the support element reliably and adequately guides the strainer bar to be inserted, and also reliable fixes the initial position of the strainer bar in the receiving cutout, while still leaving a sufficiently large pocket for the filler material in the edge region in both the transverse direction and the longitudinal direction, until the pocket then provides a permanent fixed connection between strainer bar and the receiving cutout in the support element, after being filled with a filler material.

Advantageously, the corresponding pocket has a transverse dimension of 0.05 to 2.0 mm, preferably of 0.1 to 0.5 mm, so that the pocket provides sufficiently large free space for later receiving the filler material, thus providing a secure, reliable and permanent joint between the strainer bar and the support element.

Preferably, the edge region of the corresponding receiving cutout includes at least one pocket having a pocket surface and at least one contact surface for the strainer bar, so that the edge region performs a dual function with respect to orientation of the corresponding strainer bar and the receiving cutout as well as with respect to producing the fixed connection when the pocket is filled with filler material.

In a particularly advantageous embodiment, a ratio of the sum of the contact surfaces to the a sum of the pocket surfaces is in a range of $C=0.1$ to $5.0$, preferably $C=0.1$ to $1.0$. The strainer bar can be precisely guided in the receiving cutout by spacing the support surfaces as far apart as possible.

According to a preferred embodiment of the invention, the at least one pocket of the strainer apparatus is formed by at least one cutout in the strainer bar or in the receiving cutout of the support element, or both, preferably in the edge region. Optionally, the pocket can be formed, without requiring additional machining of the receiving cutouts and/or the base region of the strainer bar, through suitable selection of the outer contour or the profile of the strainer bar and/or receiving cutout in the support element, because at least one pocket is formed by the corresponding selection of the geometry of the profile of strainer bar and receiving cutout, when the two parts are joined.

Preferably, the base region of the strainer bar is constructed to have approximately a V-shape, so that the strainer bar can be reliably centered in the associated receiving cutouts. This also facilitates automatic manufacturing.

In a preferred embodiment, an adhesive is introduced in the pocket(s) as filler material, which then hardens, so that a kind of adhesive plug is formed in the pocket which can reliably absorb shear forces and the like.

Alternatively, a formfitting clip-shaped element made of a suitable material may be inserted in the at least one pocket for temporarily securing the corresponding strainer bar in the corresponding support element, thereby producing the straining slots or gaps in the strainer apparatus, before the pocket is subsequently completely filled with the filler material.

Alternatively or in addition, at least one pocket, which can be filled with a filler material, may be provided in the base region of the corresponding strainer bar and in the receiving cutout disposed in the corresponding support element. In this way, effective tensioning between the receiving cutout and the base of the strainer bar can be additionally attained in the base region, or only in the base region.

In order to securely attach as well as to precisely orient the support element and strainer bar after permanent installation, at least one pocket is provided on the opposing edge regions, which can then be filled with filler material. The strainer bar can thus be precisely and permanently secured as well as centered in the receiving cutout of the support element.

If the strainer apparatus is implemented as a strainer basket, then the support elements can be constructed as support rings, so that the strainer apparatus has an overall cylindrical exterior shape. With a plate-shaped strainer apparatus, the support elements are configured as a support rail which can be bent into a round, for example cylindrical, shape before or after the strainer bars are applied.

In summary, it is an important feature of the strainer apparatus of the invention that a pocket or a pocket-shaped cavity is provided at least in the edge region between a receiving cutout in the corresponding support element and a strainer bar insertable into the cutout, which is filled with a filler material that may be formed as a homogeneous and uniform material or composed of a combination of fastening means. This produces, with significantly enhanced manufacturing flexibility, a strainer apparatus with substantially uniform straining slots or straining gaps, wherein only the contact surfaces need to be precision-machined. The strainer apparatus of the invention can therefore be economically manufactured.

BRIEF DESCRIPTION OF THE DRAWING

The invention will now be described with reference to an exemplary embodiment and in conjunction with the appended drawing, wherein the embodiment is not to be considered to be limited.

DETAILED DESCRIPTION OF PREFERRED EMBODIMENTS

Figure 1:
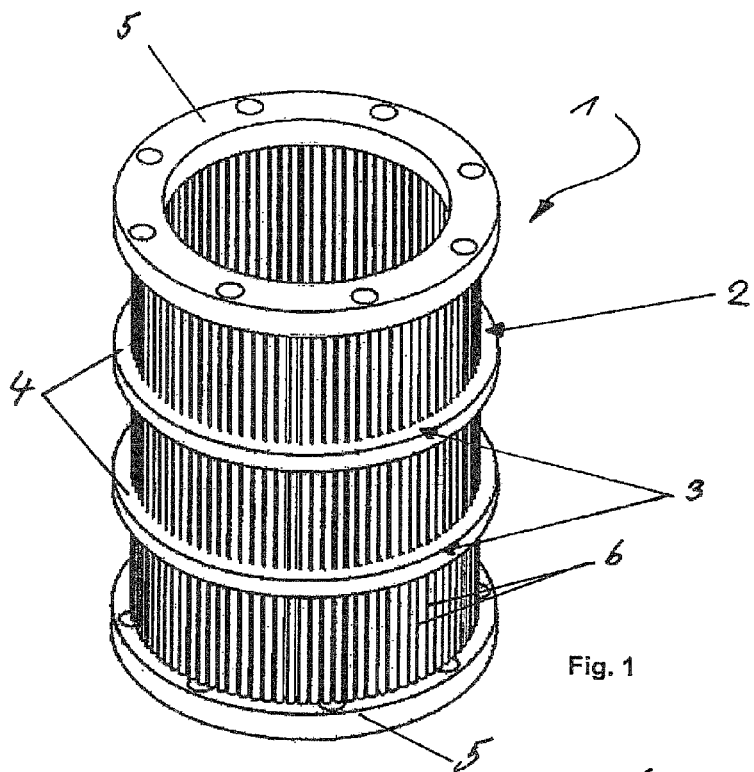
FIG. 1 is a perspective view of a strainer apparatus in form of a strainer cylinder or a strainer basket.

FIG. 1 illustrates a cylindrical strainer basket 2 representing a preferred exemplary embodiment of a strainer apparatus given the overall reference symbol 1. It will be understood that the strainer apparatus 1 of the invention may also be implemented as a strainer plate. The strainer apparatus 1 includes support elements 3 which in the illustrated example are implemented as support rings 4. Moreover, so-called end flanges 5 are provided on the axial end regions of the strainer apparatus 1. Strainer bars 6 are inserted in corresponding receiving cutouts of the support elements 3, with a corresponding straining slot or straining gap formed between the head regions of the strainer bar 6. Such bar strainer basket is schematically illustrated in FIG. 1 and known in the art.

As can be seen from FIGS. 1 to 10, the strainer apparatus 1 according to the invention is designed to have a pocket 10 located between each support element 3 and each associated strainer bar 6 at least in the edge region 7 of the corresponding receiving cutout 8 on the support element 3 or 4, wherein the pocket can be filled with filler material.

FIGS. 2 to 10 show schematically a detail of a support element 3 and of a strainer bar 6 to illustrate the permanent, fixed connection between these two elements.

Figure 2:
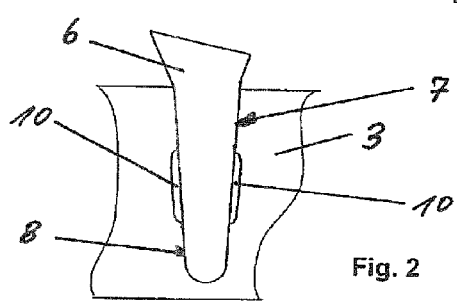
FIGS. 2 to 10 show schematically detailed views of different embodiments of pockets in the edge region of the respective receiving cutout of the support element and the associated strainer bar.
Figure 4:
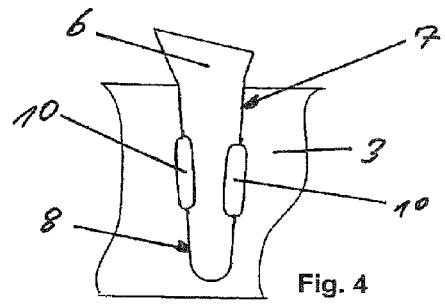
Figure 3:
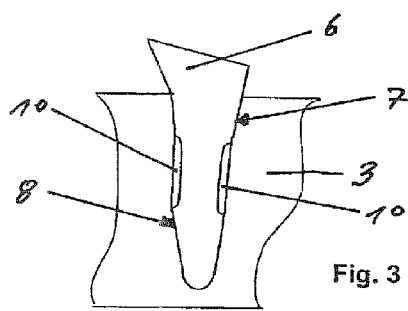

In the embodiment of FIG. 2, the pocket 10 or the pockets 10 located opposite one another is/are formed by a corresponding cutout in the edge region 7 of the support element 3. The associated base region of the strainer bar 6 is pre-fabricated and therefore does not require additional machining, so that the strainer bar can be made of a preselected, rolled material, which is then cut to length. In the exemplary embodiment shown in FIG. 3, the pocket(s) 10 is/are formed by providing a corresponding cutout in the edge region 7 of the strainer bar at opposing locations. The corresponding edge regions of the support element 3 do not require additional machining. In the embodiment of FIG. 4, the pocket(s) 10 in opposing edge regions is/are formed by associated cutouts on the support element 3 and in the base region of the strainer bar 6. In this embodiment, large-volume pockets 10 can be produced, which are then filled with a filler material, such as an adhesive and the like. This can produce pockets 10 with relatively large transverse dimensions.

Figure 5:
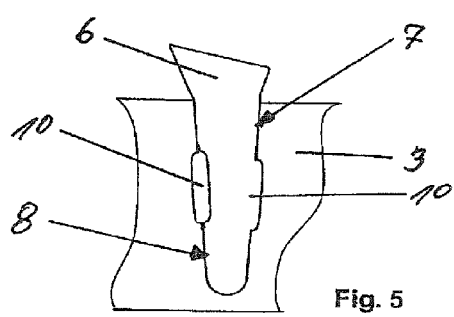

In the embodiment of FIG. 5, the pockets 10 which are located opposite to one another are formed in the edge region 7 by forming the left pocket (with reference to FIG. 5) by a combination of a cutout on the support element 3 and on the strainer bar 6, and by forming the right pocket by providing a corresponding cutout only on the support element. This approach is meant to illustrate how different embodiments of the cutouts can be combined for forming the pocket.

Figure 6:
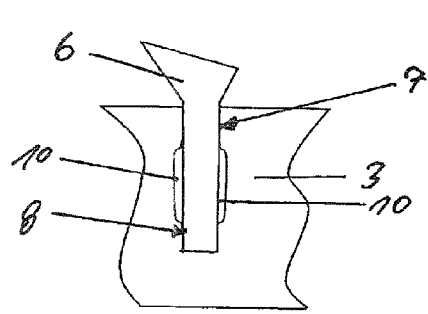
Figure 7:
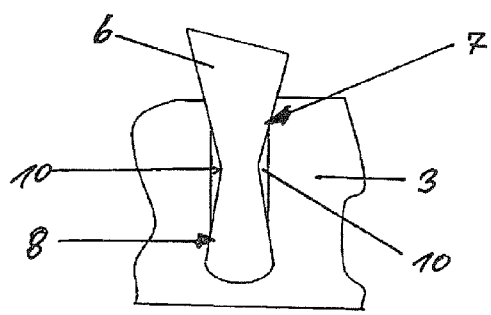

In the embodiment depicted in FIG. 6, the pocket(s) 10 is/are formed by matching the respective geometry of the outside profile of the strainer bar 6 and the profile of the receiving cutout 8 in the support element 3. Likewise, in FIG. 7, the pocket(s) 10 is/are produced by suitably designing the receiving cutouts 8 on the support element 3 and the outside geometry to the of the strainer bar 6, wherein in FIG. 7 the outside profile of the strainer bar is altered so as to form the pocket 10 in the edge region, whereas the receiving cutout 8 is formed in the support element 3 in a conventional manner.

Figure 8:
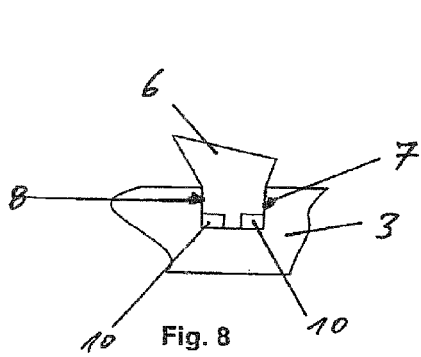

FIG. 8 illustrates another embodiment, wherein at least one pocket 10 is formed in the base region of the corresponding strainer bar 6, and wherein these pockets 10 are capable of securely clamping the corresponding strainer bar in the receiving cutout 8 in the support element, when using suitable filler material and fastening means.

Figure 9:
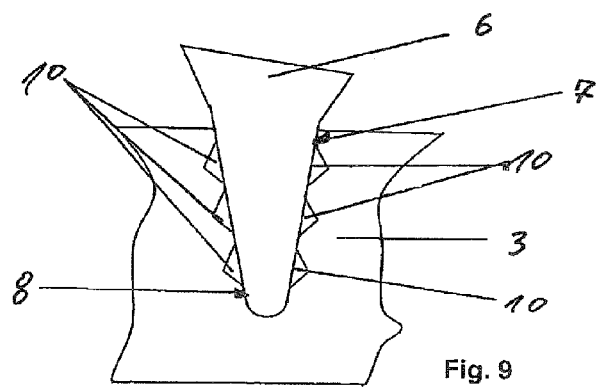

FIG. 9 illustrates in cross-section essentially V-shaped or triangular pockets 10 which are suitably cut into the interior wall of the receiving cutout 8 of the support element 3.

Figure 10:
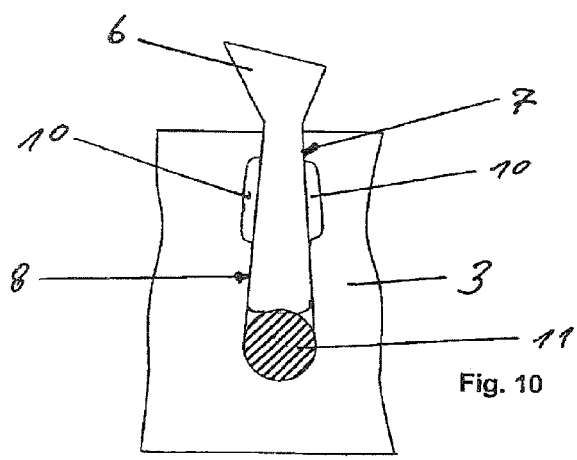

FIG. 10 shows another modified embodiment, wherein a pocket 10 is formed at the edge region 7, while additionally a pocket 11 is provided as an intermediate space between the bottom of the receiving cutout 8 of the support element 3 and the base of the strainer bar in the base region of the strainer bar 6. As indicated schematically, a formfitting clip-shaped element can be inserted, for example, into this additional pocket 11 as a primary attachment of the strainer bar 6 in the receiving cutout 8.

Preferred ratios of the geometric size of the strainer apparatus according to the invention are illustrated in and described with reference to FIGS. 11 to 13.

Figure 11:
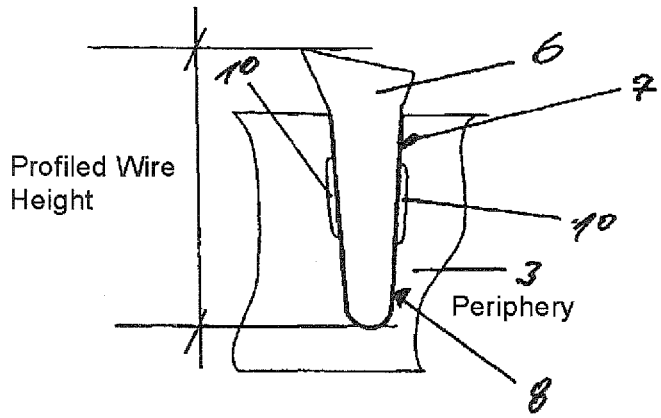
FIGS. 11 to 13 show schematically detailed views to illustrate preferred geometric details of certain embodiments.

FIG. 11 shows a strainer bar 6 with a height or profile height of approximately 3 mm to 25 mm, and preferably in a range of 5 mm and 18 mm. In this embodiment, the support element 3 and the strainer bar 6 have an overlap of 4 mm to 50 mm, in particular of 6 mm to 25 mm.

Figure 12:
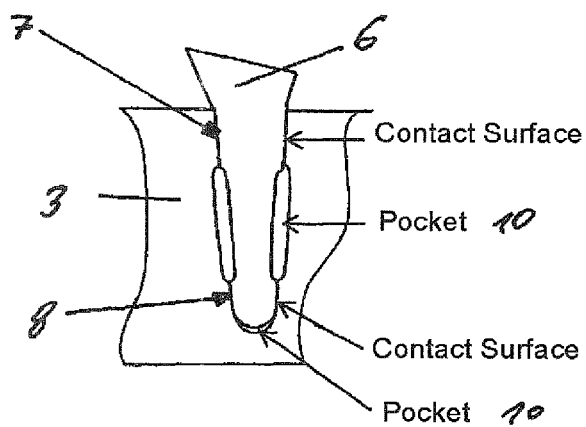

As shown in the schematic diagram of FIG. 12, support surfaces and pocket surfaces alternate in the edge region 7. A quantity C is defined as the ratio of the sum of the contact surfaces divided by the sum of the pocket surfaces. The ratio is preferably in a range from 0.1 to 5.0, more particularly in a range from 0.1 to 1.1.

Figure 13:
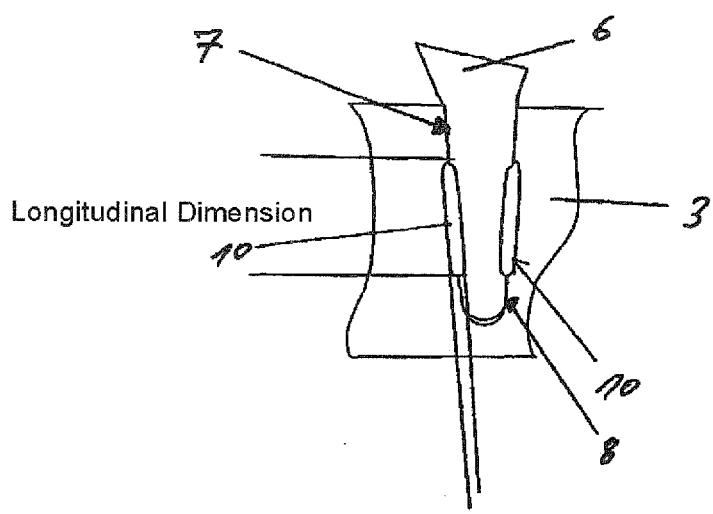

FIG. 13 illustrates the dimensions of the corresponding pocket 10. Each pocket has a longitudinal dimension and a transverse dimension. The transverse dimension is preferably in a range of 0.05 mm to 2.0 mm, and more particularly in a range of 0.1 mm to 0.5 mm.

All these dimensions have proven to be advantageous with respect to the durability of the joint between support element 3 and strainer bar 6, as well as with respect to a repeatable and precise arrangement of the strainer bars 6. This produces a strainer apparatus 1 with straining slots or straining gaps that are uniformly distributed in both the axial and the circumferential direction and that show almost no changes when the strainer apparatus is under stress during operation.

The invention is of course not limited to the aforedescribed details described in the preferred embodiments with reference to the appended drawings, but a number of optional changes and modifications can be made by a person skilled in the art, without departing from the scope of the invention. It will also be understood that combinations of different embodiments of the pocket 10 illustrated in the Figures are possible, and that embodiments and profiles of the profile bars 6 can be selected that are different from those depicted in the Figures.

What is claimed is:
1. A strainer apparatus comprising:
    a plurality of strainer bars defining straining slots or gaps between adjacent strainer bars, each strainer bar having a base region with a defined geometry in form of a taper toward the base region,
    at least one support element having tapered receiving cutouts with a geometry that matches the defined geometry of the base regions of the strainer bars, with the base regions of the strainer bars being received in the receiving cutouts, and at least one pocket disposed between each support element and each associated strainer bar and formed as a recess in at least in an edge region of the receiving cutout for that strainer bar and having a transverse dimension of 0.1 to 0.5 mm, wherein the edge region of the corresponding receiving cutout comprises the at least one pocket having a pocket surface and at least one contact surface for the strainer bar, wherein a ratio of the sum of the contact surfaces to the sum of the pocket surfaces taken over all support elements and all strainer bars is in a range of 0.1 to 1.0, wherein the at least one pocket is filled with an adhesive, with the adhesive forming the only permanent connection between the strainer bar and the support elements of the assembled strainer apparatus.

2. The strainer apparatus of claim 1, wherein the at least one pocket is formed by shaping at least one of the strainer bar base region and the receiving cutout on a corresponding support element.

3. The strainer apparatus of claim 1, wherein an overlap which depends on a shape of the strainer bar is produced between the strainer bar and the corresponding support element.

4. The strainer apparatus of claim 3, wherein the overlap is in a range of 4 mm to 50 mm.

5. The strainer apparatus of claim 3, wherein the overlap is in a range of 6 mm to 25 mm.

6. The strainer apparatus of claim 1, wherein the at least one pocket has a transverse dimension of 0.05 to 2.0 mm.

7. The strainer apparatus of claim 1, wherein the strainer bar has a height of 3 mm to 25 mm.

8. The strainer apparatus of claim 1, wherein the strainer bar has a height of 5 mm to 18 mm.

9. The strainer apparatus of claim 1, wherein the base regions of the strainer bars are approximately V-shaped.

10. The strainer apparatus of claim 1, wherein the at least one pocket is disposed in the base region of a strainer bar and in the receiving cutout of the corresponding support element.

11. The strainer apparatus of claim 1, wherein the at least one pocket is disposed on the opposing edge regions of the receiving cutouts in the support element and on a corresponding strainer bar.

12. The strainer apparatus of claim 1, wherein the at least one support element is formed as a support ring.

13. The strainer apparatus of claim 1, wherein the strainer apparatus is constructed as a strainer cylinder or a strainer basket.

14. The strainer apparatus of claim 1, wherein the strainer bars are profiled.

\* \* \* \* \*